United States Patent
Sabard et al.

(10) Patent No.: US 9,752,026 B2
(45) Date of Patent: Sep. 5, 2017

(54) NANOSTRUCTURED THERMOPLASTIC POLYAMIDE-GRAFTED POLYOLEFIN COMPOSITION

(71) Applicant: Arkema France, Colombes (FR)

(72) Inventors: Mathieu Sabard, Serquigny (FR); Stephane Bizet, Barc (FR); Jean-Jacques Flat, Goupillieres (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/779,236

(22) PCT Filed: Mar. 17, 2014

(86) PCT No.: PCT/FR2014/050611
§ 371 (c)(1),
(2) Date: Sep. 22, 2015

(87) PCT Pub. No.: WO2014/147326
PCT Pub. Date: Sep. 25, 2014

(65) Prior Publication Data
US 2016/0053105 A1   Feb. 25, 2016

(30) Foreign Application Priority Data
Mar. 22, 2013 (FR) ...................................... 13 52571

(51) Int. Cl.
| | | |
|---|---|---|
| C08L 51/00 | (2006.01) | |
| C08L 51/06 | (2006.01) | |
| C08L 23/08 | (2006.01) | |
| C08L 87/00 | (2006.01) | |
| B32B 27/06 | (2006.01) | |
| B32B 27/18 | (2006.01) | |
| B32B 27/22 | (2006.01) | |
| B32B 27/30 | (2006.01) | |
| B32B 27/32 | (2006.01) | |
| B32B 27/34 | (2006.01) | |
| C08L 51/04 | (2006.01) | |
| C08G 69/08 | (2006.01) | |
| C08G 69/48 | (2006.01) | |
| C08L 77/02 | (2006.01) | |

(52) U.S. Cl.
CPC .......... *C08L 51/006* (2013.01); *B32B 27/06* (2013.01); *B32B 27/18* (2013.01); *B32B 27/22* (2013.01); *B32B 27/308* (2013.01); *B32B 27/32* (2013.01); *B32B 27/34* (2013.01); *C08L 23/0869* (2013.01); *C08L 51/04* (2013.01); *C08L 51/06* (2013.01); *C08L 87/005* (2013.01); *B32B 2307/20* (2013.01); *B32B 2307/3065* (2013.01); *B32B 2307/71* (2013.01); *B32B 2307/714* (2013.01); *C08G 69/08* (2013.01); *C08G 69/48* (2013.01); *C08L 77/02* (2013.01); *C08L 2205/02* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 3,963,799 A | 6/1976 | Starkweather, Jr. | |
| 3,976,720 A | 8/1976 | Hammer et al. | |
| 5,342,886 A | 8/1994 | Glotin et al. | |
| 2002/0004555 A1* | 1/2002 | Di-Benedetto | C08L 77/00 525/66 |
| 2006/0148987 A1* | 7/2006 | Schauder | C08L 23/10 525/178 |
| 2010/0099817 A1 | 4/2010 | Bizet et al. | |
| 2013/0150517 A1* | 6/2013 | Tarbit | C08L 77/02 524/502 |
| 2016/0247953 A1* | 8/2016 | Aussedat | H01L 31/0481 |

FOREIGN PATENT DOCUMENTS

| | | |
|---|---|---|
| EP | 2 196 489 A1 | 6/2010 |
| FR | 2 291 225 A1 | 6/1976 |
| FR | 2 912 150 A1 | 8/2008 |
| FR | 2 918 150 A1 | 1/2009 |
| WO | WO 02/28959 A1 | 4/2002 |
| WO | WO 2006/085007 A1 | 8/2006 |

OTHER PUBLICATIONS

International Search Report (PCT/ISA/210) mailed on Jun. 18, 2014, by the French Patent Office as the International Searching Authority for International Application No. PCT/FR2014/050611.

* cited by examiner

*Primary Examiner* — Jeffrey Mullis
(74) *Attorney, Agent, or Firm* — Buchanan Ingersoll & Rooney P.C.

(57) ABSTRACT

A composition including at least two grafted copolymers, having a polyolefin trunk and polyamide grafts, the polyamide grafts being 15% to 25% by weight of the composition. Also, a multilayered structure including a plurality of adjacent layers, at least one of which has the above composition. The first grafted copolymer is a polyolefin backbone containing a residue of at least one unsaturated monomer (X) and a plurality of polyamide grafts, the polyamide grafts are attached to the polyolefin backbone by the residue of the unsaturated monomer (X). The second copolymer is a grafted elastomeric copolymer of a polyolefin backbone.

11 Claims, No Drawings

NANOSTRUCTURED THERMOPLASTIC POLYAMIDE-GRAFTED POLYOLEFIN COMPOSITION

FIELD OF THE INVENTION

A subject of the invention is a nanostructured thermoplastic composition preferably comprising a mixture of at least one ethylene-based terpolymer and a copolymer also based on ethylene, this terpolymer and this copolymer each having a not inconsiderable amount of a particular type of graft.

The invention also relates to a multilayer structure in which at least one of the layers consists of the composition according to the invention.

PRIOR ART

Document WO 02/28959 describes a graft copolymer with polyamide blocks on a polyolefin backbone which is chosen from ethylene/maleic anhydride and ethylene/alkyl (meth)acrylate/maleic anhydride copolymers, forming a nanostructured co-continuous blend; this gives this terpolymer/copolymer exceptional thermomechanical properties that are maintained when this graft copolymer is redispersed in flexible polyolefins such as flexible ethylene polymers.

Such mixtures are used as adhesives, films, tarpaulins, calendered products, electrical cables or powders for slush molding processes. In document WO 2006/085007, such a composition was used to form a heat protection layer for a substrate subjected to temperatures of greater than 150° Celsius (° C.).

These materials are referred to as nanostructured, as defined in the two abovementioned patent documents, which gives them advantageous properties in terms of their low levels of hardness (between 82 and 95 Shore A) and their good thermomechanical resistance beyond the melting point of the polyolefin phase.

In the current state of the art, thermoplastic products are also known which are used for applications requiring low hardness/thermomechanical resistance and which are polymers such as thermoplastic elastomers (for example Santoprene® from Exxon, which comprises a polypropylene (PP) matrix in which an ethylene/propylene/diene (EPDM) copolymer is dispersed, chlorinated polymers (Nakanprene® from Kem One) and super-thermoplastic vulcanizates (Super TPV) (for example ETPV from DuPont and TPSiV from Dow Corning Multibase). These low levels of hardness can be obtained either by adding plasticizer (entailing exudation problems) or by increasing the amount of EPDM which entails a considerable reduction in heat resistance at temperatures greater than 150° C. In the case of vulcanized materials, recycling may also be problematic.

It is therefore particularly difficult to combine a level of hardness lower than 80 Shore A and a modulus of elasticity at 150° C. of greater than 1 MPa (megapascal) without degrading some of the properties of the material (exudation, heat resistance, recyclability, etc.).

Moreover, a third property which is important in numerous applications is compression set, which should be as low as possible.

Of these two types of polymers, neither the polyolefin nor the polyamide-grafted elastomers mentioned above have advantageous properties both in terms of hardness (which is to be low) and in terms of the modulus of elasticity at high temperatures, although these are components which otherwise have satisfactory thermomechanical resistance. The same applies to the compression set.

BRIEF DESCRIPTION OF THE INVENTION

After various experiments and modifications, it has been observed by the applicant that, contrary to the teaching well known to those skilled in the art, a nanostructured co-continuous composition comprising determined amounts of a first copolymer and a second elastomeric copolymer, these two components being grafted by a polyamide in a certain percentage range by weight of the composition, has low hardness and particularly improved thermomechanical resistance and compression set.

Moreover, it has been observed by the applicant that such a composition diluted in an ethylene-based copolymer, preferably a copolymer of ethylene and alkyl acrylate, to a ratio of 80% of the composition according to the invention to 20% of said copolymer, enables the abovementioned properties of the composition according to the invention to be retained intact, or almost intact.

Thus, the present invention relates to a thermoplastic composition consisting of a first copolymer and a second elastomeric copolymer, these two copolymers being grafted by a plurality of polyamide grafts, the composition optionally comprising a third copolymer of a different nature than the first two copolymers and/or at least one functional adjuvant, characterized in that:

the first grafted copolymer consists of a polyolefin backbone containing a residue of at least one unsaturated monomer (X) and a plurality of polyamide grafts, the polyamide grafts are attached to the polyolefin backbone by the residue of the unsaturated monomer (X) comprising a function capable of reacting by a condensation reaction with a polyamide having at least one amine end group and/or at least one carboxylic acid end group, the residue of the unsaturated monomer (X) is fixed to the backbone by grafting or copolymerization; and the second copolymer consists of a grafted elastomeric copolymer consisting of a polyolefin backbone selected from a maleicized ethylene-propylene copolymer, a maleicized ethylene-butene copolymer, a maleicized ethylene-hexene copolymer, a maleicized ethylene-octene copolymer, a maleicized ethylene-methyl acrylate copolymer, and a plurality of polyamide grafts;

and in that, apart from in the case of the abovementioned third copolymer present in the composition, the following weight ratios are satisfied:

between 10% and 70% by weight of the composition for the polyolefin backbone of the abovementioned first copolymer, between 10% and 70% by weight of the composition for the polyolefin backbone of the abovementioned second copolymer, between 15% and 25% by weight of the composition for the polyamide grafts (fixed to the first and second copolymer).

Other advantageous features of the invention are specified hereinbelow:

Advantageously, the unsaturated monomer (X) is maleic anhydride.

Preferably, the first copolymer is an ethylene/alkyl (meth) acrylate/maleic anhydride terpolymer.

Advantageously, the abovementioned grafted polymer is nanostructured.

According to a particular feature of the invention, the number-average molar mass of the abovementioned polyamide grafts of the abovementioned grafted polymer is within the range from 1000 to 10000 g/mol, preferably between 1000 and 5000 g/mol.

Advantageously, the polyamide grafts comprise at least one copolyamide, for example mono-$NH_2$-terminated 6/11, and/or a monofunctional-$NH_2$-terminated polyamide 6, and/or a monofunctional-$NH_2$-terminated polyamide 11.

According to a particular feature of the invention, the abovementioned first copolymer and/or the abovementioned second copolymer represent between 30% and 50% by weight of the composition.

Preferably, the polyamide grafts represent between 17% and 23% by weight of the composition, and very advantageously between 19% and 21% by weight of said composition.

Advantageously, the third copolymer is based on ethylene, preferably consisting of an ethylene/acrylate copolymer. Moreover, the abovementioned third copolymer is present in the composition at between 5% and 20% by weight, preferably between 7% and 15%.

According to one possibility afforded by the invention, the functional adjuvant consists of a plasticizer, an adhesion promoter, a UV stabilizer and/or a UV absorber, an antioxidant, a flame retardant, and/or a dyeing/whitening agent.

The invention also relates to a multilayer structure comprising a plurality of adjacent layers, characterized in that at least one of these layers consists of the composition as defined above.

It should be noted that the composition according to the invention is presented in connection with an application in an electrical cable (in particular because of electric overheating and the particular mechanical properties required) but, of course, this composition may be envisaged for all other applications in which such a composition is advantageously useable, in particular in multilayer structures such as, for example, skis, adhesive coatings or films, or air or fluid transport pipes (in particular for its characteristics of resistance to chemical attack).

DETAILED DESCRIPTION OF THE INVENTION

The polyolefin backbone of the first grafted polymer is a polymer which comprises, as monomer, an α-olefin.

α-Olefins having from 2 to 30 carbon atoms are preferred.

By way of α-olefin, mention may be made of ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene, et 1-triacontene.

Mention may also be made of the cycloolefins having from 3 to 30 carbon atoms, preferably from 3 to 20 carbon atoms, such as cyclopentane, cycloheptene, norbornene, 5-methyl-2-norbornene, tetracyclododecene, and 2-methyl-1,4,5,8-dimethano-1,2,3,4,4a,5,8,8a-octahydronaphthalene; diolefins and polyolefins, such as butadiene, isoprene, 4-methyl-1,3-pentadiene, 1,4-pentadiene, 1,5-hexadiene, 1,3-hexadiene, 1,3-octadiene, 1,4-octadiene, 1,5-octadiene, 1,6-octadiene, ethylidene norbornene, vinyl norbornene, dicyclopentadiene, 7-methyl-1,6-octadiene, 4-ethylidene-8-methyl-1,7-nonadiene, and 5,9-dimethyl-1,4,8-decatriene; aromatic vinyl compounds such as mono- or polyalkylstyrenes (comprising styrene, o-methylstyrene, m-methylstyrene, p-methylstyrene, o,p-dimethylstyrene, o-ethylstyrene, m-ethylstyrene and p-ethylstyrene), and derivatives comprising functional groups such as methoxystyrene, ethoxystyrene, vinylbenzoic acid, methyl vinylbenzoate, vinylbenzyl acetate, hydroxystyrene, o-chlorostyrene, p-chlorostyrene, divinylbenzene, 3-phenylpropene, 4-phenylpropene, α-methylstyrene, vinyl chloride, 1,2-difluoroethylene, 1,2-dichloroethylene, tetrafluoroethylene, and 3,3,3-trifluoro-1-propene.

Within the context of the present invention, the term α-olefin also comprises styrene. As α-olefin, propylene is preferred and most especially ethylene.

This polyolefin may be a homopolymer when just one α-olefin is polymerized in the polymer chain. By way of example, mention may be made of polyethylene (PE) or polypropylene (PP).

This polyolefin may also be a copolymer when at least two comonomers are copolymerized in the polymer chain, one of the two comonomers, referred to as "first comonomer", being an α-olefin and the other comonomer, referred to as "second comonomer", is a monomer capable of polymerizing with the first monomer.

By way of second comonomer, mention may be made of:
  one of the α-olefins already mentioned, the latter being different from the first α-olefin comonomer,
  dienes such as, for example, 1,4-hexadiene, ethylidene norbornene, butadiene,
  unsaturated carboxylic acid esters, such as, for example, alkyl acrylates or alkyl methacrylates, grouped together under the term alkyl (meth)acrylates. The alkyl chains of these (meth)acrylates may have up to 30 carbon atoms. As alkyl chains, mention may be made of methyl, ethyl, le propyl, n-butyl, sec-butyl, isobutyl, tert-butyl, pentyl, hexyl, heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl. Methyl, ethyl and butyl (meth)acrylates are preferred as esters of unsaturated carboxylic acids,
  vinyl esters of carboxylic acids. By way of example of vinyl esters of carboxylic acid, mention may be made of vinyl acetate, vinyl versatate, vinyl propionate, vinyl butyrate or vinyl maleate. Vinyl acetate is preferred as vinyl ester of carboxylic acid.

Advantageously, the polyolefin backbone comprises at least 50 mol % of the first comonomer; the density thereof may advantageously be between 0.91 and 0.96.

The preferred polyolefin backbones consist of an ethylene-alkyl (meth)acrylate copolymer. By using this polyolefin backbone, excellent resistance to aging, light and temperature is obtained.

If different "second comonomers" were copolymerized in the polyolefin backbone, this would not constitute a departure from the scope of the invention.

According to the present invention, the polyolefin backbone contains at least one residue of an unsaturated monomer (X) which may react with an acid and/or amine function of the polyamide graft in a condensation reaction. According to the definition of the invention, the unsaturated monomer (X) is not a "second comonomer".

As unsaturated monomer (X) included on the polyolefin backbone, mention may be made of:
  unsaturated epoxides. Among these they are, for example, aliphatic glycidyl esters and ethers such as allyl glycidyl ether, vinyl glycidyl ether, glycidyl maleate and glycidyl itaconate, glycidyl acrylate and glycidyl methacrylate. They are also, for example, alicyclic glycidyl esters and ethers such as 2-cyclohexene-1-glycidyl ether, glycidyl cyclohexene-4,5-dicarboxylate, glycidyl cyclohexene-4-carboxylate, glycidyl 5-norbornene-2-methyl-2-carboxylate and diglycidyl endo-cis-bicyclo [2.2.1]-5-heptene-2,3-dicarboxylate. As unsaturated epoxide, glycidyl methacrylate is preferably used,
  unsaturated carboxylic acids and their salts, for example acrylic acid or methacrylic acid and the salts of these same acids,
  carboxylic acid anhydrides. They may be chosen, for example, from maleic, itaconic, citraconic, allylsuccinic, cyclohex-4-ene-1,2-dicarboxylic, 4-methylenecyclohex-4-ene-1,2-dicarboxylic, bicyclo[2.2.1] hept-5-ene-2,3-dicarboxylic and x-methylbicyclo

[2.2.1]hept-5-ene-2,2-dicarboxylic anhydrides. As carboxylic acid anhydride, maleic anhydride is preferably used.

The unsaturated monomer (X) is preferably an unsaturated carboxylic acid anhydride.

According to one advantageous version of the invention, the average preferred number of unsaturated monomer (X) fixed to the polyolefin backbone is greater than or equal to 1.3 and/or preferably less than or equal to 20.

Thus, if (X) is maleic anhydride and the number-average molar mass of the polyolefin is 15000 g/mol, it has been found that this corresponds to a proportion of anhydride of at least 0.8%, and at most 6.5%, by weight of the whole polyolefin backbone. These values, combined with the mass of the polyamide grafts, determine the proportion of polyamide and of backbone in the polyamide-grafted polymer.

The polyolefin backbone containing the residue of the unsaturated monomer (X) is obtained by polymerization of the monomers (first comonomer, optional second comonomer, and optionally unsaturated monomer (X)). This polymerization can be carried out by a high-pressure radical process or a process in solution, in an autoclave or tubular reactor, these processes and reactors being well known to those skilled in the art. When the unsaturated monomer (X) is not copolymerized in the polyolefin backbone, it is grafted to the polyolefin backbone. The grafting is also an operation that is known per se. The composition would be in accordance with the invention if several different functional monomers (X) were copolymerized with and/or grafted to the polyolefin backbone.

Depending on the types and ratio of monomers, the polyolefin backbone may be semicrystalline or amorphous. In the case of amorphous polyolefins, only the glass transition temperature is observed, whereas in the case of semicrystalline polyolefins a glass transition temperature and a melting temperature (which will inevitably be higher) are observed. A person skilled in the art will only have to select the ratios of monomer and the molecular weights of the polyolefin backbone in order to be able to easily obtain the desired values of the glass transition temperature, optionally of the melting temperature, and also of the viscosity of the polyolefin backbone.

Preferably, the polyolefin has a Melt Flow Index (MFI) of between 3 and 400 g/10 min (190° C., 2.16 kg, ASTM D 1238).

The polyolefin backbone of the second grafted copolymer is chosen from a limited list, namely from a maleicized ethylene-propylene copolymer, a maleicized ethylene-butene copolymer, a maleicized ethylene-hexene copolymer, a maleicized ethylene-octene copolymer and a maleicized ethylene-methacrylate copolymer.

With regard to the abovementioned first or second grafted polymer, between 15 and 25% by weight of polyamide grafts will be used, in consideration of the sum of the polyamide grafts for the two grafted polymers. These polyamide grafts are grafted in the conventional way, according to one of the techniques well known to those skilled in the art, either to the maleic anhydride of the first copolymer or to the functional monomer of the second copolymer (the monomer other than ethylene).

The polyamide grafts, whether present on the first copolymer or the second copolymer, may be either homopolyamides or copolyamides.

Aliphatic homopolyamides resulting from the polycondensation:
of a lactam,
or of an aliphatic α,ω-aminocarboxylic acid,
or of an aliphatic diamine and an aliphatic diacid
are particularly targeted by the expression "polyamide grafts".

As examples of a lactam, mention may be made of caprolactam, oenantholactam and lauryllactam.

As examples of an aliphatic α,ω-aminocarboxylic acid, mention may be made of aminocaproic acid, 7-aminoheptanoic acid, 11-aminoundecanoic acid and 12-aminododecanoic acid.

As examples of an aliphatic diamine, mention may be made of hexamethylenediamine, dodecamethylenediamine and trimethylhexamethylenediamine.

As examples of an aliphatic diacid, mention may be made of adipic, azelaic, suberic, sebacic and dodecanedicarboxylic acids.

Among the aliphatic homopolyamides, mention may be made, by way of example and nonlimitingly, of the following polyamides: polycaprolactam (PA-6); polyundecanamide (PA-11, sold by Arkema under the brand Rilsan®); polylauryllactam (PA-12, also sold by Arkema under the brand Rilsan®); polybutylene adipamide (PA-4,6); polyhexamethylene adipamide (PA-6,6); polyhexamethylene azelamide (PA-6,9); polyhexamethylene sebacamide (PA-6,10); polyhexamethylene dodecanamide (PA-6,12); polydecamethylene dodecanamide (PA-10,12); polydecamethylene sebacamide (PA-10,10) and polydodecamethylene dodecanamide (PA-12,12).

The expression "semicrystalline polyamides" also targets cycloaliphatic homopolyamides.

Mention may especially be made of the cycloaliphatic homopolyamides that result from the condensation of a cycloaliphatic diamine and an aliphatic diacid.

As an example of a cycloaliphatic diamine, mention may be made of 4,4'-methylenebis(cyclohexylamine), also known as para-bis(aminocyclohexyl)methane or PACM, 2,2'-dimethyl-4,4'-methylenebis(cyclohexylamine), also known as bis(3-methyl-4-aminocyclohexyl)methane or BMACM.

Thus, among the cycloaliphatic homopolyamides, mention may be made of the polyamides PACM,12 resulting from the condensation of PACM with the C12 diacid, BMACM,10 and BMACM,12 resulting from the condensation of BMACM with, respectively, C10 and C12 aliphatic diacids.

The expression "polyamide grafts" also targets the semiaromatic homopolyamides that result from the condensation:
of an aliphatic diamine and an aromatic diacid, such as terephthalic acid (T) and isophthalic acid (I). The polyamides obtained are then commonly known as "polyphthalamides" or PPAs; and;
of an aromatic diamine, such as xylylenediamine, and more particularly meta-xylylenediamine (MXD) and an aliphatic diacid.

Thus, nonlimitingly, mention may be made of the polyamides 6,T, 6,I, MXD,6 or else MXD,10.

The polyamide grafts used in the composition according to the invention are preferably copolyamides. The latter result from the polycondensation of at least two of the groups of monitors presented above for obtaining homopolyamides. The term "monomer" in the present description of the copolyamides must be understood in the sense of "repeating unit". Indeed, the case in which one repeating unit of PA consists of the combination of a diacid and a diamine, is characteristic. It is considered that the combination of a diamine and a diacid, that is to say the diamine-diacid pair (in equimolar amounts), corresponds to the monomer. This is explained by the fact that, individually, the diacid or the diamine is only a structural unit and on its own is insufficient to undergo polymerization to give a polyamide.

Thus copolyamides cover in particular the condensation products:
- of at least two lactams,
- of at least two aliphatic α,ω-aminocarboxylic acids,
- of at least one lactam and at least one aliphatic α,ω-aminocarboxylic acid,
- of at least two diamines and at least two diacids,
- of at least one lactam with at least one diamine and at least one diacid,
- of at least one aliphatic α,ω-aminocarboxylic acid with at least one diamine and at least one diacid, the diamine(s) and the diacid(s) possibly being, independently of one another, aliphatic, cycloaliphatic or aromatic.

Depending on the types and ratio of monomers, the copolyamides may be semicrystalline or amorphous. In the case of amorphous copolyamides, only the glass transition temperature is observed, whereas in the case of semicrystalline copolyamides, a glass transition temperature and a melting temperature (which will inevitably be higher) are observed.

Among the amorphous copolyamides that can be used within the context of the invention, mention may be made, for example, of the copolyamides containing semiaromatic monomers.

Among the copolyamides, it is also possible to use semicrystalline copolyamides and particularly those of the PA-6/11, PA-6/12 and PA-6/11/12 type.

The degree of polymerization may vary to a large extent; depending on its value it is a polyamide or a polyamide oligomer.

Advantageously, the polyamide grafts are monofunctional.

So that the polyamide graft has a monoamine end group, it is sufficient to use a chain stopper of formula:

in which:
R1 is hydrogen or a linear or branched alkyl group containing up to 20 carbon atoms; and
R2 is a linear or branched alkyl or alkenyl group having up to 20 carbon atoms, a saturated or unsaturated cycloaliphatic radical, an aromatic radical or a combination of the preceding. The limiter may be, for example, laurylamine or oleylamine.

So that the polyamide graft has a monocarboxylic acid end group, it is sufficient to use a chain limiter of formula R'1-COOH, R'1-CO—O—CO—R'2 or a dicarboxylic acid.

R'1 and R'2 are linear or branched alkyl groups containing up to 20 carbon atoms.

Advantageously, the polyamide graft has one end group having an amine functionality. The preferred monofunctional polymerization limiters are laurylamine and oleylamine.

The polyamide grafts have a molar mass of between 1000 and 10000 g/mol and preferably between 1000 and 5000 g/mol.

The polycondensation may be used to graft the polyamide grafts, and it is carried out according to the conventionally known processes, for example at a temperature of generally between 200 and 300° C., under vacuum or under an inert atmosphere, with stirring of the reaction mixture. The average chain length of the graft is determined by the initial molar ratio between the polycondensable monomer or the lactam and the monofunctional polymerization limiter. For the calculation of the average chain length, one chain limiter molecule is usually counted per one graft chain.

A person skilled in the art will only have to select the types and ratio of monomers and also choose the molar masses of the polyamide grafts in order to be able to easily obtain the desired values of the glass transition temperature, optionally of the melting temperature and also of the viscosity of the polyamide graft.

The condensation reaction of the polyamide graft on the polyolefin backbone (first or second copolymer) containing the residue of X (or the functionalized monomer for the second grafted copolymer, namely the elastomeric copolymer) is carried out by reaction of one amine or acid function of the polyamide graft with the residue of X. Advantageously, monoamine polyamide grafts are used and amide or imide bonds are created by reacting the amine function with the function of the residue of X.

This condensation is preferably carried out in the melt state. To manufacture the composition according to the invention, it is possible to use conventional kneading and/or extrusion techniques. The components of the composition are thus blended to form a compound which may optionally be granulated on exiting the die. Advantageously, coupling agents are added during the compounding.

To obtain a nanostructured composition, it is thus possible to mix the polyamide graft and the backbone in an extruder, at a temperature generally between 200° C. and 300° C. The average residence time of the molten material in the extruder may be between 5 seconds and 5 minutes, and preferably between 20 seconds and 1 minute. The efficiency of this condensation reaction is evaluated by selective extraction of free polyamide grafts, that is to say those that have not reacted to form the polyamide-grafted polymer.

The preparation of polyamide grafts having an amine end group and also their addition to a polyolefin backbone containing the residue of (X) or of a functionalized monomer (second copolymer) is described in U.S. Pat. No. 3,976,720, U.S. Pat. No. 3,963,799, U.S. Pat. No. 5,342,886 and FR 2291225. The polyamide-grafted polymer of the present invention advantageously has a nanostructured organization.

Plasticizers could be added to the composition according to the invention in order to facilitate processing and improve the productivity of the process for manufacturing the composition and the structures. Mention will be made, as examples, of paraffinic, aromatic or naphthalenic mineral oils which also make it possible to improve the adhesive strength of the composition according to the invention. Mention may also be made, as plasticizer, of phthalates, azelates, adipates, and tricresyl phosphate.

Similarly, adhesion promoters, although not necessary, may advantageously be added in order to improve the adhesive strength of the composition when this adhesive strength must be particularly high. The adhesion promoter is a non-polymeric ingredient; it may be organic, crystalline, mineral and more preferably semi-mineral semi-organic. Among the latter, mention may be made of organic titanates or silanes, such as for example monoalkyl titanates, trichlorosilanes and trialkoxysilanes. It is also possible to provide for these adhesion promoters to be directly grafted to the first or the second copolymer by a technique well known to those skilled in the art, for example via reactive extrusion.

Since UV radiation is capable of resulting in a slight yellowing of the thermoplastic compositions, UV stabilizers and UV absorbers (these compounds being generally referred to as anti-UV agents), such as benzotriazole, benzophenone and other hindered amines, may be added in certain applications in which such a phenomenon is to be avoided. These compounds may be, for example, based on benzophenone or benzotriazole. They can be added in amounts of less than 10%, and preferably of from 0.1% to 5%, by weight of the total weight of the composition.

Antioxidants could also be added in order to limit yellowing during the manufacture of the composition, such as phosphorus-containing compounds (phosphonites and/or phosphites) and hindered phenolics. These antioxidants can be added in amounts of less than 10%, and preferably of from 0.1% to 5%, by weight of the total weight of the composition.

Similarly, in certain applications, flame retardants may also be added to the composition according to the invention. These flame retardants may be halogenated or non-halogenated. Among the halogenated flame retardants, mention may be made of brominated products. Use may also be made, as non-halogenated flame retardants, of additives based on phosphorus such as ammonium polyphosphate, aluminum phosphinates or phosphonates, melamine cyanurate, pentaerythritol, zeolites and also mixtures of these agents. The composition may comprise these agents in proportions ranging from 3% to 40% relative to the total weight of the composition. It is also possible to add dyeing or whitening compounds.

It is also possible to add pigments to the composition, such as for example dyeing or whitening compounds, in proportions generally ranging from 5% to 15% relative to the total weight of the composition.

Preparation of the Composition According to the Invention:

As has been mentioned above, the technique of grafting polyamide grafts to the polyolefin backbone in order to obtain the polyamide-grafted polyolefin according to the invention is well known to those skilled in the art, and especially from the documents cited above FR 2912150, FR 2918150 or EP 2 196 489.

It is not therefore outside the scope of the invention if crosslinking agents are added. As examples, mention may be made of isocyanates or organic peroxides. This crosslinking may also be carried out by known irradiation techniques. This crosslinking may be carried out by one of numerous methods known to those skilled in the art, especially by the use of heat-activated initiators, for example peroxides and azo compounds, photoinitiators such as benzophenone, by radiation techniques comprising light rays, UV rays, electron beams and X-rays, silanes bearing reactive functions such as an aminosilane, an epoxysilane, a vinylsilane such as for example vinyltriethoxysilane or vinyltrimethoxysilane, and moisture crosslinking. The manual entitled "Handbook of polymer foams and technology" above, pages 198 to 204, provides additional information to which those skilled in the art may refer.

Materials Used to Form the Formulations Tested:

Lotader® 5500: terpolymer of ethylene, ethyl acrylate (15.5% by weight) and maleic anhydride (2.8% by weight) produced by Arkema, with an MFI (190° C. under 2.16 kg measured according to ISO 1133) of 20 g/10 min;

Maleicized EPR (<<Ethylene Propylene Rubber>>) Exxelor VA 1803: sold by Exxon;

Polyamide prepolymer: Mono-NH$_2$-terminated polyamide 6 prepolymer, Mw 2500 g/mol, produced by the applicant. This prepolymer was synthesized by polycondensation from δ-lactam. Laurylamine is used as a chain limiter so as to have only one primary amine function at the end of the chain. The number-average molar mass of the prepolymer is 2500 g/mol.

Apolhya®: The Apolhya family is a family of polymers sold by Arkema which combine the properties of polyamides with those of polyolefins by virtue of co-continuous morphologies being obtained on the nanometer scale. It is a blend composed of Lotader® and mono-NH$_2$-terminated polyamide 6 prepolymer, for example Lotader® 5500 and mono-NH$_2$-terminated PA6 prepolymer with a molar mass of 2500 g/mol.

Obtaining the Formulations and Films Tested:

Essentially, three types of compositions were prepared to carry out the tests, namely a composition of Apolhya® type, hereinafter referred to as "composition no. 1", a composition consisting of a mixture of Lotader® and maleicized EPR VA 1803, hereinafter referred to as "composition no. 2", and a plurality of compositions consisting of a mixture of EPR VA 1803 grafted by polyamide prepolymers and Apolhya® and referred to hereinafter by the following composition numbers, in which the proportions by weight of each of the three components (EPR VA 1803, mono-NH$_2$-terminated polyamide 6 prepolymer grafts with a molar mass of 2500 g/mol and Lotader® 5500) vary as follows:

| Composition no. | Lotader® 5500 (% by weight of the composition) | EPR VA 1803 (% by weight of the composition) | Polyamide 6 prepolymers (% by weight of the composition) |
|---|---|---|---|
| 3 | 75 | 10 | 15 |
| 4 | 70 | 20 | 10 |
| 5 | 70 | 25 | 5 |
| 6 | 10 | 75 | 15 |
| 7 | 20 | 70 | 10 |
| 8 | 25 | 70 | 5 |
| 9 | 65 | 18 | 17 |
| 10 | 17 | 66 | 17 |
| 11 | 14 | 63 | 23 |
| 12 | 57 | 23 | 20 |
| 13 | 25 | 58 | 17 |
| 14 | 57 | 26 | 17 |
| 15 | 37 | 43 | 20 |
| 16 | 40 | 40 | 20 |
| 17 | 37.5 | 41.5 | 21 |

The "compounding" of each composition was carried out on a co-rotating twin-screw extruder of Leistriz type, with a 34 mm (millimeter) diameter and a length 32 times its diameter, with a flat profile at 240° C., a throughput of 15 kg/h (kilograms per hour) and a rotational speed of 300 rpm (revolutions per minute). The materials are introduced into the main feed.

Tests Carried Out on the Films:

Three types of tests were mainly carried out on compositions 1 to 17 in order to test for potential resolution of the abovementioned technical problems; it should however be noted that the compositions according to the invention moreover have other particularly advantageous properties.

These three tests consist on the one hand of measuring the modulus of elasticity at 150° C., expressed in megapascal (MPa), of measuring the Shore hardness at ambient temperature and finally of determining the compression set.

Test of the "Modulus of Elasticity at 150° C.":

The modulus of elasticity at 150° C. was measured by DMA (dynamic mechanical analysis) under stress, at a stressing frequency of 1 Hz (Hertz). The measurements were taken on samples dried under vacuum at 80° C. for one night.

For these mechanical tests (including the following test concerning Shore hardness), 1 mm thick monolayer strips were produced by extrusion casting on a laboratory extrusion line. For this purpose, a laboratory counter-rotating twin-screw extruder from RHEO, with 2 conical screws 31.8 mm in diameter and 300 mm long and equipped with a 3 cm (centimeter) wide sheet die having a 1 mm (millimeter) opening, was used. The barrel components are heated with a flat profile at 210° C.; the rotational speed of the screws is 80 rpm.

The results for each composition are reproduced in the table below.

| composition no. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Results of modulus of elasticity test at 150° C. | 1 | 0 | 0.9 | 0.8 | 0.6 | 0.5 | 0.4 | 0.3 | 2.5 | 2.6 | 2.5 | 4 | 2 | 3.5 | 2.5 | 2.6 | 2.5 |

Test of Shore A Hardness:

The Shore A hardness was measured according to the specifications of standard ISO 868. The apparatus used is a Hildebrand Shore A durometer. The tests were carried out at 23° C. It is recalled here that the dial of the durometer is graduated in Shore A degrees from 1 to 100, from soft to hard.

The results for each composition are reproduced in the table below.

| composition no. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Results of the Shore hardness test | 82 | <55 | 81 | 78 | 77 | 66 | 63 | 60 | 79 | 67 | 73 | 79 | 70 | 76 | 75 | 76 | 77 |

Compression Set:

The tests of compression set were carried out according to standard ISO 815.

A deformation of 25% was applied. The samples are in the form of injection-molded blocks 29 mm in diameter and 12.5 mm thick.

These blocks were produced by injection molding on a Kraus Maffei injection press. The following process parameters were used:

Injection temperature (feed/nozzle): 200/220° C.
Mold temperature: 25° C.
Hold time: 40 seconds
Hold pressure on the material: 667 bar
Cooling time: 50 seconds The compression set (CS) is given by the following formula:

$$CS\ (\%) = (h_o - h_d)/(h_o - h_c) \times 100$$

in which $h_o$ is the height (sample thickness) before the test, here 12.5 mm $h_d$ is the height of the sample measured 30 minutes after 25% deformation $h_c$, is the height of the spacer, here 9.40 mm The compression set for each block of compositions 1 to 17 is measured in two cases; namely for 24 hours of compression at a temperature of 23° C. and for 22 hours of compression at a temperature of 70° C.

The results for each composition are reproduced in the table below.

| composition no. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| CS (%) at 23° C. after 24 hours of compression | 38 | 21 | 37 | 36 | 35 | 31 | 29 | 28 | 36 | 31 | 34 | 37 | 32 | 35 | 35 | 31 | 36 |
| CS (%) at 70° C. after 22 hours of compression | 83 | 44 | 82 | 79 | 78 | 67 | 64 | 61 | 80 | 68 | 74 | 79 | 71 | 77 | 76 | 69 | 78 |

The results for the three tests carried out on each of the compositions clearly demonstrate on the one hand the technical advantages of the composition according to the invention even though these advantages can in no way be predicted, and on the other hand the preferred ranges (% by weight) for this composition.

The invention claimed is:

1. A thermoplastic composition consisting of a first copolymer and a second elastomeric copolymer, these two copolymers being grafted by a plurality of polyamide grafts, and optionally, a third copolymer and/or an adjuvant, wherein:
   the first grafted copolymer consists of a polyolefin backbone containing a residue of at least one unsaturated monomer (X) and a plurality of polyamide grafts, the polyamide grafts are attached to the polyolefin backbone by the residue of the unsaturated monomer (X) comprising a function capable of reacting by a condensation reaction with a polyamide having at least one amine end group and/or at least one carboxylic acid end group, the residue of the unsaturated monomer (X) is fixed to the backbone by grafting or copolymerization;
   the second copolymer consists of a grafted elastomeric copolymer consisting of a polyolefin backbone selected from a maleicized ethylene-propylene copolymer, a maleicized ethylene-butene copolymer, a maleicized ethylene-hexene copolymer, a maleicized ethylene-octene copolymer, a maleicized ethylene-methyl acrylate copolymer, and a plurality of polyamide grafts; and
   the third copolymer, when present, is a copolymer of ethylene and acrylate and different from the first and second copolymers;
   wherein the following weight ratios are satisfied:
   between 10% and 70% by weight of the composition, with or without the third copolymer, for the polyolefin backbone of the first copolymer,
   between 10% and 70% by weight of the composition, with or without the third copolymer, for the polyolefin backbone of the second copolymer,
   between 15% and 25% by weight of the composition, with or without the third copolymer, for the polyamide grafts (fixed to the first and second copolymer), and
   wherein the adjuvant is present in the composition and is selected from the group consisting of a plasticizer, an adhesion promoter, a UV stabilizer and/or a UV absorber, an antioxidant, a flame retardant, and a dyeing/whitening agent.

2. The composition as claimed in claim 1, wherein the unsaturated monomer (X) is maleic anhydride.

3. The composition as claimed in claim 2, wherein the first copolymer is an ethylene/alkyl (meth)acrylate/maleic anhydride terpolymer.

4. The composition as claimed in claim 1, wherein the grafted polymer is nanostructured.

5. The composition as claimed in claim 1, wherein the number-average molar mass of the polyamide grafts of the grafted polymer is within the range from 1000 to 10 000 g/mol.

6. The composition as claimed in claim 1, wherein the polyamide grafts comprise at least one copolyamide.

7. The composition as claimed in claim 1, wherein the first copolymer and/or the second copolymer represent between 30% and 50% by weight of the composition, with or without the third copolymer.

8. The composition as claimed in claim 1, wherein the polyamide grafts represent between 17% and 23% by weight of the composition, with or without the third copolymer.

9. The composition as claimed in claim 1, wherein the third copolymer is present in the composition at between 5% and 20% by weight.

10. A multilayer structure comprising a plurality of adjacent layers, wherein at least one of these layers consists of the composition as defined in claim 1.

11. The composition as claimed in claim 6, wherein the at least one copolyamide is selected from the group consisting of mono-$NH_2$-terminated 6/11, monofunctional-$NH_2$-terminated polyamide 6 and monofunctional-$NH_2$-terminated polyamide 11.

* * * * *